(12) United States Patent
Henneman

(10) Patent No.: US 10,433,537 B1
(45) Date of Patent: Oct. 8, 2019

(54) ANIMAL LURE

(71) Applicant: Kevin Marion Henneman, Three Rivers, MI (US)

(72) Inventor: Kevin Marion Henneman, Three Rivers, MI (US)

(*) Notice: Subject to any disclaimer, the term of this patent is extended or adjusted under 35 U.S.C. 154(b) by 0 days.

(21) Appl. No.: 15/612,850

(22) Filed: Jun. 2, 2017

Related U.S. Application Data

(60) Provisional application No. 62/345,232, filed on Jun. 3, 2016, provisional application No. 62/474,795, filed on Mar. 22, 2017.

(51) Int. Cl.
| | | |
|---|---|---|
| *A01M 31/00* | (2006.01) | |
| *B65D 75/20* | (2006.01) | |
| *B65D 75/52* | (2006.01) | |
| *B65D 75/56* | (2006.01) | |
| *B65D 75/58* | (2006.01) | |
| *B65D 85/00* | (2006.01) | |

(52) U.S. Cl.
CPC .......... *A01M 31/008* (2013.01); *B65D 75/20* (2013.01); *B65D 75/527* (2013.01); *B65D 75/566* (2013.01); *B65D 75/5805* (2013.01); *B65D 75/5855* (2013.01); *B65D 85/70* (2013.01); *B65D 2575/565* (2013.01); *B65D 2575/586* (2013.01)

(58) Field of Classification Search
CPC ..... A01M 31/008; A01M 1/205; B65D 75/20; B65D 75/527; B65D 75/566; B65D 75/5805; B65D 75/5855; B65D 85/70; B65D 2575/565; B65D 2575/586

USPC ............... 43/1; 239/47, 48; 119/711
See application file for complete search history.

(56) References Cited

U.S. PATENT DOCUMENTS

| | | | | |
|---|---|---|---|---|
| 4,804,142 A * | 2/1989 | Riley | ............ | A01M 29/12 239/56 |
| 5,074,439 A * | 12/1991 | Wilcox | ............ | A01M 31/008 206/38 |
| 5,164,178 A * | 11/1992 | Muysson | ............ | A61L 9/046 206/0.5 |
| 5,857,281 A * | 1/1999 | Bergquist | ............ | A01M 31/008 239/47 |
| 6,165,570 A * | 12/2000 | Shannon | ............ | A01M 31/008 424/84 |
| 6,279,297 B1 * | 8/2001 | Latronico | ............ | B65B 61/18 53/139.2 |
| 6,557,778 B1 * | 5/2003 | Shiffler | ............ | A01M 1/2055 239/53 |
| 6,676,033 B1 * | 1/2004 | Campesi, Sr. | ...... | A01M 31/008 239/44 |
| 7,073,732 B2 * | 7/2006 | Abbas | ............ | A01M 31/008 239/302 |
| 8,739,455 B2 * | 6/2014 | Burgeson | ............ | A01M 31/008 222/181.1 |
| 2007/0092479 A1 * | 4/2007 | Turriff | ............ | A01M 31/00 424/76.2 |

(Continued)

*Primary Examiner* — Alexander M Valvis
(74) *Attorney, Agent, or Firm* — Larry E. Henneman, Jr.; Henneman & Associates, PLC

(57) ABSTRACT

A novel animal lure includes an absorbent substrate and animal attractant scent fluid disposed directly on the absorbent substrate and hermetically sealed in a package. In a particular embodiment, the animal lure further includes a non-absorbent extraction feature connected to the absorbent substrate. In a more particular embodiment, the package is formed from opaque, fluid-proof, and flexible material.

27 Claims, 21 Drawing Sheets

(56) References Cited

U.S. PATENT DOCUMENTS

| | | | | |
|---|---|---|---|---|
| 2008/0092426 A1* | 4/2008 | Modlin | ............... | A01M 1/2038 |
| | | | | 43/1 |
| 2008/0273913 A1* | 11/2008 | Austreng | ............ | A01M 31/008 |
| | | | | 401/118 |
| 2014/0252110 A1* | 9/2014 | Smith | ................. | A01M 31/008 |
| | | | | 239/6 |
| 2017/0166376 A1* | 6/2017 | Birkeland | .............. | B65D 75/30 |

* cited by examiner

ANIMAL LURE

CROSS-REFERENCE TO RELATED APPLICATIONS

This application claims the benefit of priority to U.S. Provisional Patent Application Ser. No. 62/345,232, filed Jun. 3, 2016 by the same inventor and entitled "Disposable Animal Lure And A Method Of Manufacture," which is incorporated by reference herein in its entirety. This application also claims the benefit of priority to U.S. Provisional Patent Application Ser. No. 62/474,795, filed Mar. 22, 2017 by the same inventor and entitled "Disposable Animal Lure And A Method Of Manufacture," which is incorporated by reference herein in its entirety.

BACKGROUND OF THE INVENTION

Field of the Invention

This invention relates generally to animal scent attractants, and more particularly to animal scent attractant dispersal.

Description of the Background Art

There are various types of scents (e.g., food, sexual hormones, animal urine, gland secretions, etc.) that are used to attract scent-driven animals. For example, bottled deer urine is widely used by deer hunters and preservationists to attract curious deer via smell. The idea is that the wind carries the odor to distant deer. When the deer smells the urine, they oftentimes investigate by moving closer to the location in which it was dispersed. Typically, a hunter will disperse the urine on nearby foliage around hunting locations. There are many ways the urine is dispersed. For example, the bottle of urine is often poured on the ground, on tree branches, etc.

There are several disadvantages to current methods and devices for dispersing scent lures. For example, dispersing bottled scent lures is unsanitary. This is because it can spill on the hunter and/or on the outside of the bottle. In addition, it is undesirable for a hunter to put a messy bottle of urine back in their pocket for later use. Another disadvantage is that dispersing the urine on foliage is wasteful because much of it flows down into the ground. Of course, the less scent lure in contact with the air, the less effective it is. Such waste is particularly undesirable because scent lures are expensive. For hunters participating in only a single hunt, an entire bottle of scent lure is unnecessary. Yet another disadvantage is that only a fraction of the bottle is typically used per hunt and, therefore, has to be carried by the hunter.

What is needed, therefore, is a means for dispersing animal lures that is more sanitary. What is also needed is a more efficient and effective means for dispersing animal lures into the air. What is also needed is a less expensive means for dispersing animal lures. What is also needed is a means for maintaining a higher quality animal lure. What is also needed is a more convenient means for transporting animal scent.

SUMMARY

The present invention overcomes the problems associated with the prior art by providing a disposable animal lure that is sanitary, convenient to use, convenient to carry, and inexpensive.

The animal lure comprises an absorbent substrate, an animal attractant fluid disposed directly on the absorbent substrate, and a fluid proof package. The absorbent substrate and the animal attractant fluid are hermetically sealed in the package.

In a particular embodiment, the animal lure further includes an extraction feature coupled directly to the absorbent substrate. In one embodiment, the extraction feature mechanically engages the absorbent substrate. In a more particular embodiment, at least part of the extraction feature passes through the absorbent substrate. In another embodiment, the extraction feature is bonded to the non-absorbent substrate via a urine-resistant adhesive. In a particular embodiment, the extraction feature is non-absorbent. In a more particular embodiment, the extraction feature includes a first end, an intermediate region, and a second end. The first end is attached to the absorbent substrate and is disposed in the package. The intermediate region extends through the package and the second end is disposed outside the package. In an even more particular embodiment, the first end of the extraction feature is tapered to facilitate the extraction of the absorbent substrate from the package. In another embodiment, the extraction feature includes a hanger feature. In an alternate embodiment, the extraction feature is a garment hook. In yet another embodiment, the extraction feature is an integral part of the package. In a more particular embodiment, the extraction feature includes the absorbent substrate having a first end and an opposite second end and the package having an opening feature disposed between the first end of the absorbent substrate and the second end of the absorbent substrate. The first end of the absorbent substrate is fixed to the package and the second end is disposed within a hermetically sealed region of the package. The second end of the absorbent substrate can be removed from the hermetically sealed region of the package without detaching the first end of the absorbent substrate from the package.

In another embodiment, the fluid proof package is opaque. In yet another embodiment, the package is tamper evident. In another embodiment, the package is formed from metalized laminate film. In one embodiment, the package includes a preformed pouch. A more particular embodiment, the preformed pouch is a bottom load pouch. In an even more particular embodiment, the package includes a zip seal feature. In an alternate embodiment, the package includes a form fill seal package. In another alternate embodiment, the package is a peel package. In another embodiment, the absorbent substrate is vacuum sealed in the package. In other embodiments, an inert gas is disposed in the package. In another embodiment, the package further comprises instructions for using the animal lure.

In another embodiment, the animal attractant fluid has a color and the absorbent substrate has a color. The color of the absorbent substrate is darker than the color of the animal attractant fluid.

In yet another embodiment, the animal attractant fluid includes urine. In a more particular embodiment, the urine is natural animal urine. In another more particular embodiment, the urine is synthetic urine.

A method of manufacturing an animal lure is also described. The method includes the steps of forming an absorbent substrate, disposing animal attractant fluid directly on the absorbent substrate, forming a fluid proof package, and hermetically sealing the absorbent substrate and the animal attractant fluid in the package. In a more particular embodiment, the package is a preformed pouch and the step of hermetically sealing the absorbent substrate and the animal attractant fluid in the package is carried out after the absorbent substrate and the animal attractant fluid is disposed in the pouch. In another particular embodiment, the package is formed directly around the absorbent substrate and the animal attractant fluid via form fill packaging.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by an animal lure having a pre-saturated substrate disposed within a hermetically sealed package. In the following description, numerous specific details are set forth (e.g., package materials, substrate materials, scent types, etc.) in order to provide a thorough understanding of the invention. Those skilled in the art will recognize, however, that the invention may be practiced apart from these specific details.

Figure 1:
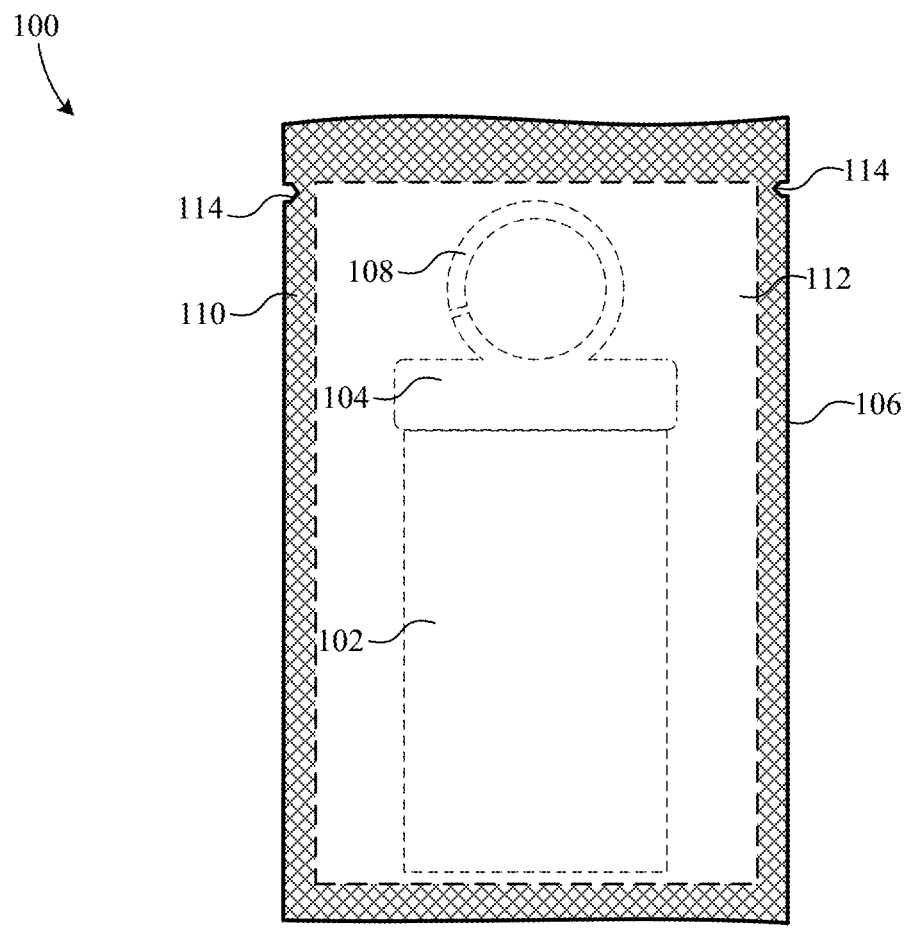
FIG. 1 is a front view of an animal lure according to one embodiment of the present invention.

FIG. 1 shows a front view of an animal lure 100 according to one embodiment of the present invention. Animal lure 100 includes an animal attractant scent fluid (not visible), an absorbent substrate 102, and an extraction feature 104 (e.g. tether), all hermetically sealed within a package 106.

In this particular embodiment, substrate 102 is formed from a piece of absorbent material and is pre-saturated with an animal attractant scent such as, for example, animal urine.

Extraction feature 104 is attached directly to substrate 102 and provides a means for removing substrate 102 from package 106 without having to touch substrate 102 and the animal scent disposed thereon. Furthermore, extraction feature 104 is formed from a non-absorbent material (e.g. plastic) so as to prevent it from absorbing the animal scent disposed on substrate 102. In the example embodiment, extraction feature 104 includes a hanger feature 108 which enables substrate 102 to be pulled from package 106 and hung from a suitable object such as, for example, a tree limb.

In this particular embodiment, package 106 is formed from an opaque fluid-proof material such as, for example, metalized film. Package 106 includes a seal 110 formed (e.g. hot bar sealed) completely around the peripheral of package 106 thereby defining in interior region 112 where saturated substrate 102 and extraction feature 104 are permanently sealed until use. Accordingly, seal 110 is inherently tamper evident. Package 106 further includes a pair of notches 114 for tearing the top of package 106 open. Once the top of package 106 is torn open, a user can access extraction feature 104 to pull substrate 102 out of package 106 without having to touch the animal scent disposed on substrate 102.

Figure 2:
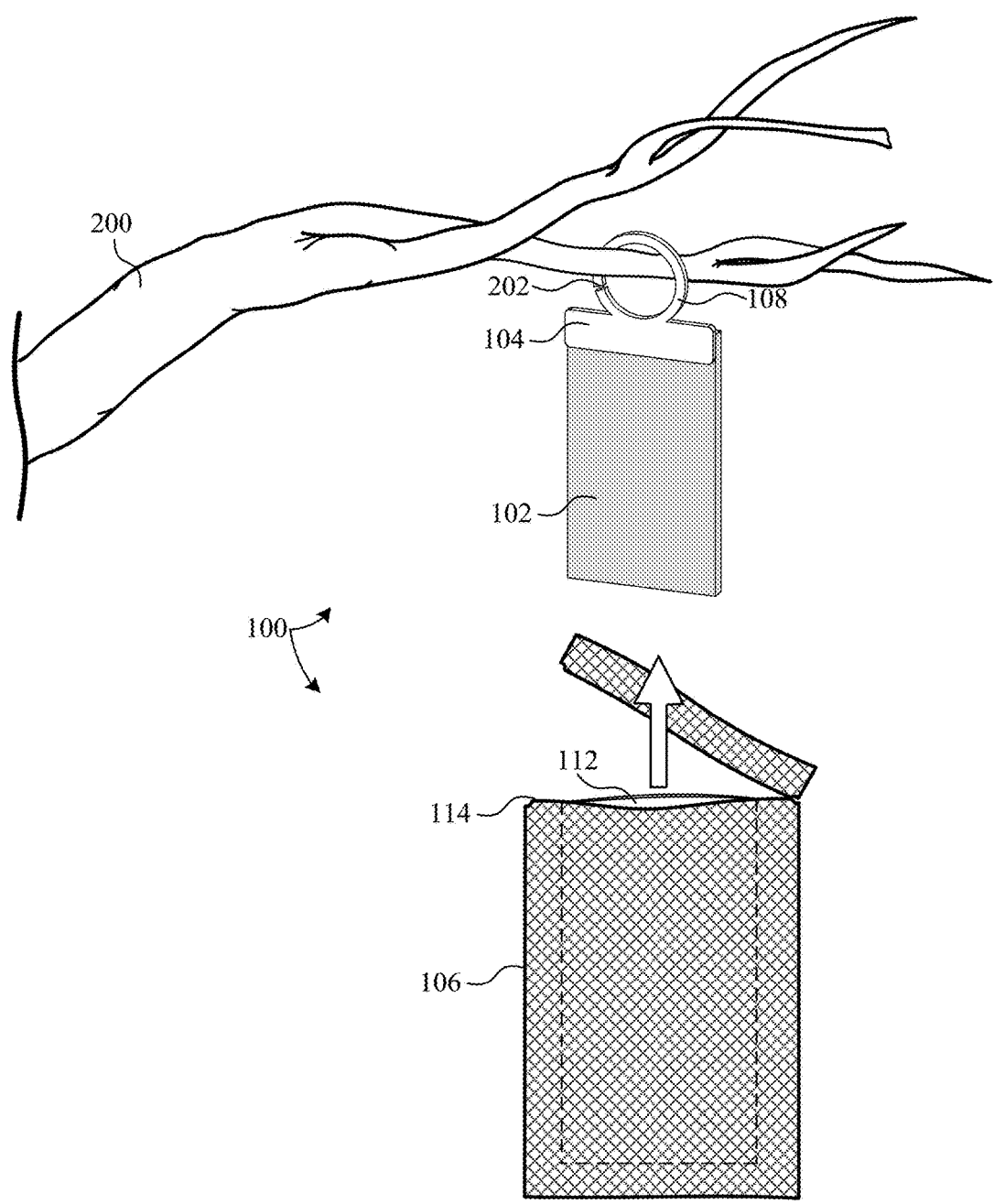
FIG. 2 is a front view of the animal lure of FIG. 1 hanging from a tree limb.

FIG. 2 shows a perspective view of animal lure 100 hanging from a tree limb 200. In a typical application, package 106 is first torn open at notches 114 thereby exposing extraction feature 104. Then, the user grabs extraction feature 104 and pulls substrate 102 out of package 106. Once removed, hanger feature 108 is flexed sufficient to open a notch 202 of hanger feature 108. With notch 202 opened, the user can position hanger feature 108 around tree limb 200. It should be recognized that animal lure 100 eliminates the need for a user to carry a bottle of animal scent because substrate 102 is already pre-saturated during packaging. It should be recognized that the present invention is much more convenient, portable, and sanitary than prior art solutions to scent dispersal.

Figure 3A:
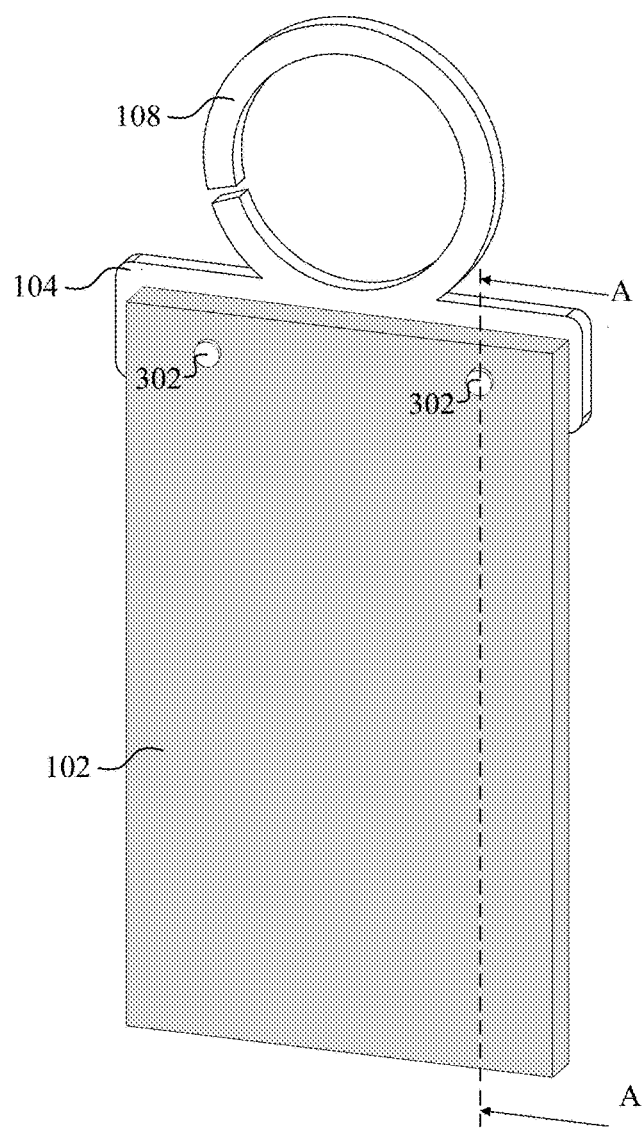
FIG. 3A is a rear perspective view of an absorbent substrate and a nonabsorbent extraction feature of the animal lure of FIG. 1.

FIG. 3A shows a rear perspective view of substrate 102 and extraction feature 104. In this particular embodiment, substrate 102 is a rectangular section of absorbent material such as, for example, non-woven fabric (e.g., natural wool blend felt, synthetic blend felt, etc.). Depending on the particular application, the material of substrate 102 can have different properties. For example, absorbent antimicrobial material can be used to preserve the quality of both substrate 102 and the animal scent applied thereto when a particular animal scent (e.g., organic gland secretions, urine, etc.) is susceptible to microorganism breakdown that could otherwise degrade the quality of the animal scent. As another example, absorbent biodegradable material can be used (e.g., natural cotton blends, natural wool blends, etc.) so that substrate 102 decomposes after use.

One important aspect of the present invention is that substrate 102 is intentionally manufactured to be dark in color (e.g. black, brown, camouflage, etc.). This provides at least two advantages. First, the animal scent is not visible on a dark substrate. This is beneficial in that animal lure 100 will not have a low quality appearance if the animal scent is not evenly distributed on substrate 102. For example, if 10% of substrate 102 is left dry, the dry region will be visually indistinguishable over the remaining saturated 90% of substrate 102. Second, dark/patterned substrates are less visible to animals.

Another aspect of the present invention is that extraction feature 104 is formed from glow-in-the-dark plastic (e.g. phosphor based plastics) to allow the user to see extraction feature 104 in low light conditions.

In this particular embodiment, extraction feature 104 mechanically engages substrate 102 via a set of protrusions 300 that pass directly through substrate 102. The inventor has found that many adhesives breakdown over time when exposed to certain liquid animal scents. The direct mechanical engagement of protrusions 300 to substrate 102 eliminates problems associated with adhesive breakdown.

Figure 3B:
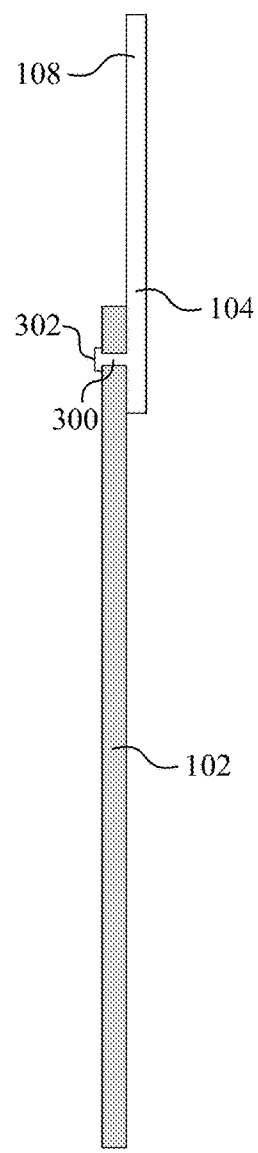
FIG. 3B is a cross-sectional side view of the absorbent substrate and the nonabsorbent extraction feature of FIG. 1 taken along line A-A of FIG. 3A.

FIG. 3B shows a cross-sectional side view of substrate 102 and extraction feature 104 taken along line A-A of FIG. 3A. As shown, the end of each protrusion 300 includes a retaining feature 302 that prevents substrate 102 and extraction feature 104 from separating. In this example, retaining features 302 are integrally formed (e.g. integrally molded) heads that have a larger diameter than the rest of protrusions 300. Alternatively, retaining features 302 could be substituted with barbs formed at the ends of protrusions 300.

Figure 4:
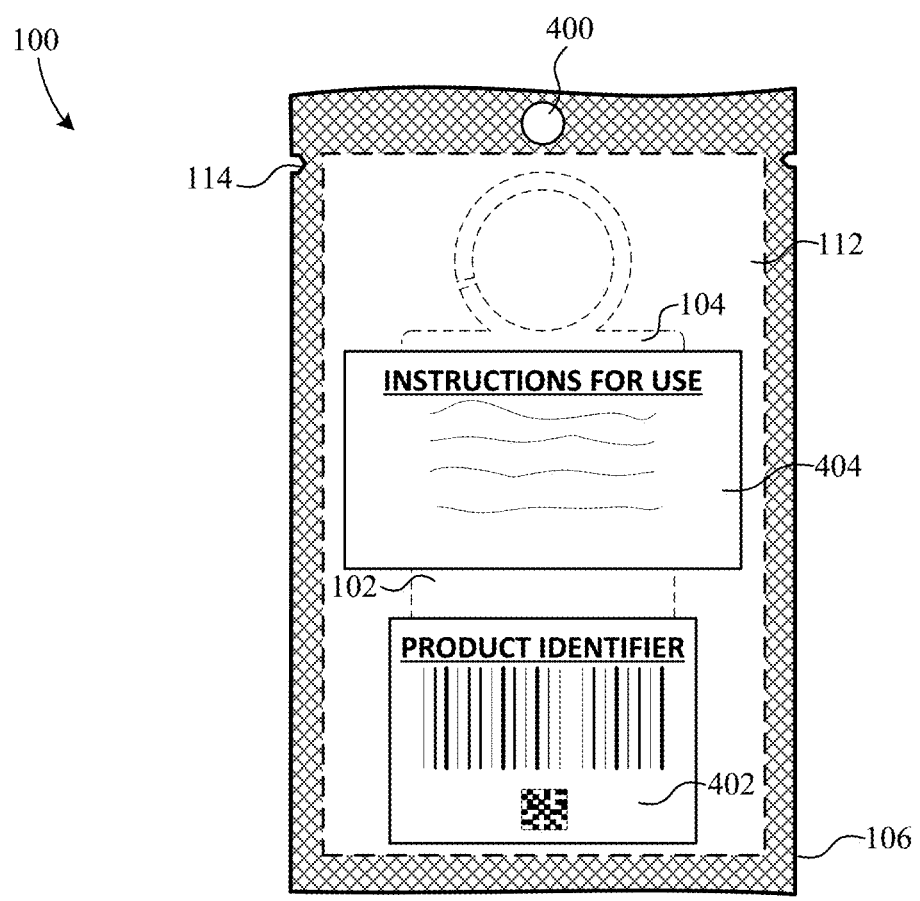
FIG. 4 is a front view of the animal lure of FIG. 1 according to an alternate embodiment of the present invention.

FIG. 4 shows a front view of animal lure 100 according to an alternate embodiment of the present invention. In this particular embodiment, the exterior of package 106 further includes a shelf-peg hole 400, a product identifier 402, and instructions for use 404. Shelf-peg hole 400 facilitates displaying animal lure 100 in retail stores. Product identifier 402 is, for example, a universal product code for tracking animal lure 100 in retail and inventory environments. Instructions 404 include instructions for using animal lure 100.

Figure 5:
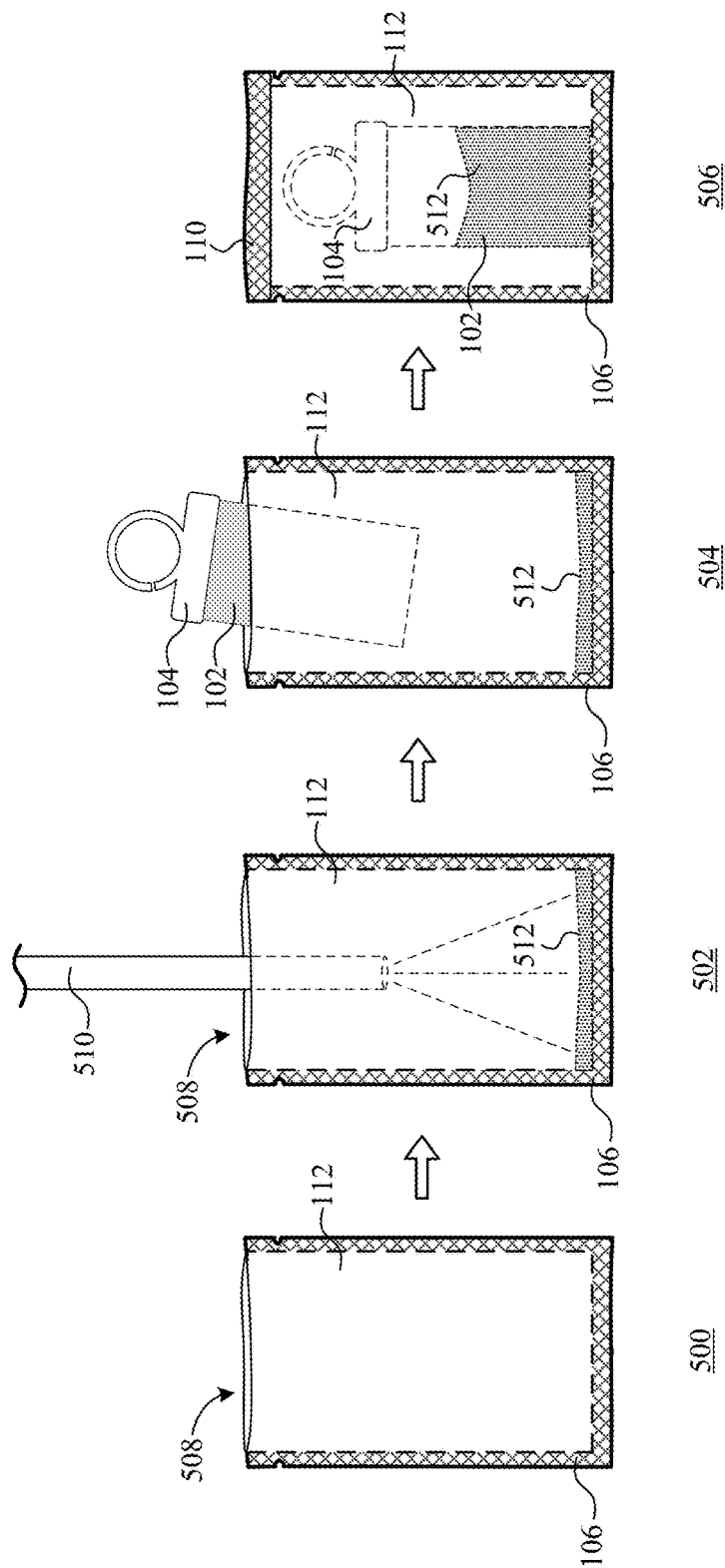
FIG. 5 is a process flow-diagram illustrating a method for manufacturing the animal lure of FIG. 1 according to one embodiment of the present invention.

FIG. 5 is a process flow-diagram illustrating a method for manufacturing of animal lure 100 according to one embodiment of the present invention. The example method is illustrated through a sequence of processes 500, 502, 404, and 506.

In process 500, package 106 is pulled open. In this example, package 106 is a top-loading preformed pouch wherein the top opening 508 of package 106 is not yet sealed.

Then, in process 502, package 106 is aligned with a fluid dispenser 510. Once aligned, dispenser 510 is inserted into interior region 112 and a sufficient volume of animal attractant scent 512 is then dispensed into interior region 112. Although the invention is not limited to a particular liquid to substrate weight ratio, the inventor has achieved good results when the weight of the liquid is between 285%-315% of the substrate weight. The inventor has also found that inserting dispenser 510 below the area where top opening 508 will be eventually sealed in process 506, liquid is less likely to contact the area and degrade the quality of the seal formed in process 506.

Next, in process 504, substrate 102 and attached extraction feature 104 are placed in interior region 112 such that animal attractant scent fluid 512 is absorbed by substrate 102.

Finally, in process 506, opening 508 is sealed by, for example, a hot bar sealing process.

Although the invention is not limited to a particular packaging process, processes 500, 502, 504, and 506 can be carried at different stages of an automated rotary machine. In such a case, process 500 is carried out at a first rotary stage where package 106 is pulled from a hopper and opened by some suitable means such as, for example, vacuum suction cups. Then, the rotary machine rotates 90 degrees to position open package 106 at a second rotary stage where scent fluid 512 is dispensed from dispenser 510. After process 502, the rotary machine rotates another 90 degrees to a third rotary stage where substrate 102 and attached extraction feature 104 are dropped into interior region 112, either automatically or manually. Next, the rotary machine rotates another 90 degrees to position package 106, scent fluid 512, substrate 102, and extraction feature 104 at a fourth stage where package 106 is hot bar sealed and then dropped into a catch bin. Once animal lure 100 is dropped, the cycle is complete and rotary machine rotates another 90 degrees, thereby returning to the first stage where the process is repeated.

Depending on the particular application, various different types of liquid scents can be used. For example, natural animal scents (e.g., deer urine, deer gland secretions, etc.), natural animal food scents (e.g., apple, corn, acorn, etc.), synthetic animal scents, and synthetic food scents are desirable. Depending on how susceptible the particular scent is to decomposition, such as with some organic scents, preservative measures can be taken to preserve shelf-life of animal lure 100. For example, an inert gas flushing process can be implemented at any time during the packaging process before package 106 is sealed. The inert gas forces ambient air out of interior region 112 thereby inhibiting bacteria growth and any other unwanted chemical breakdown that is accelerated with ambient air. As another measure, process 506 can include a vacuum sealing process that draws unwanted air from the package before the sealing process is complete.

Figure 6:
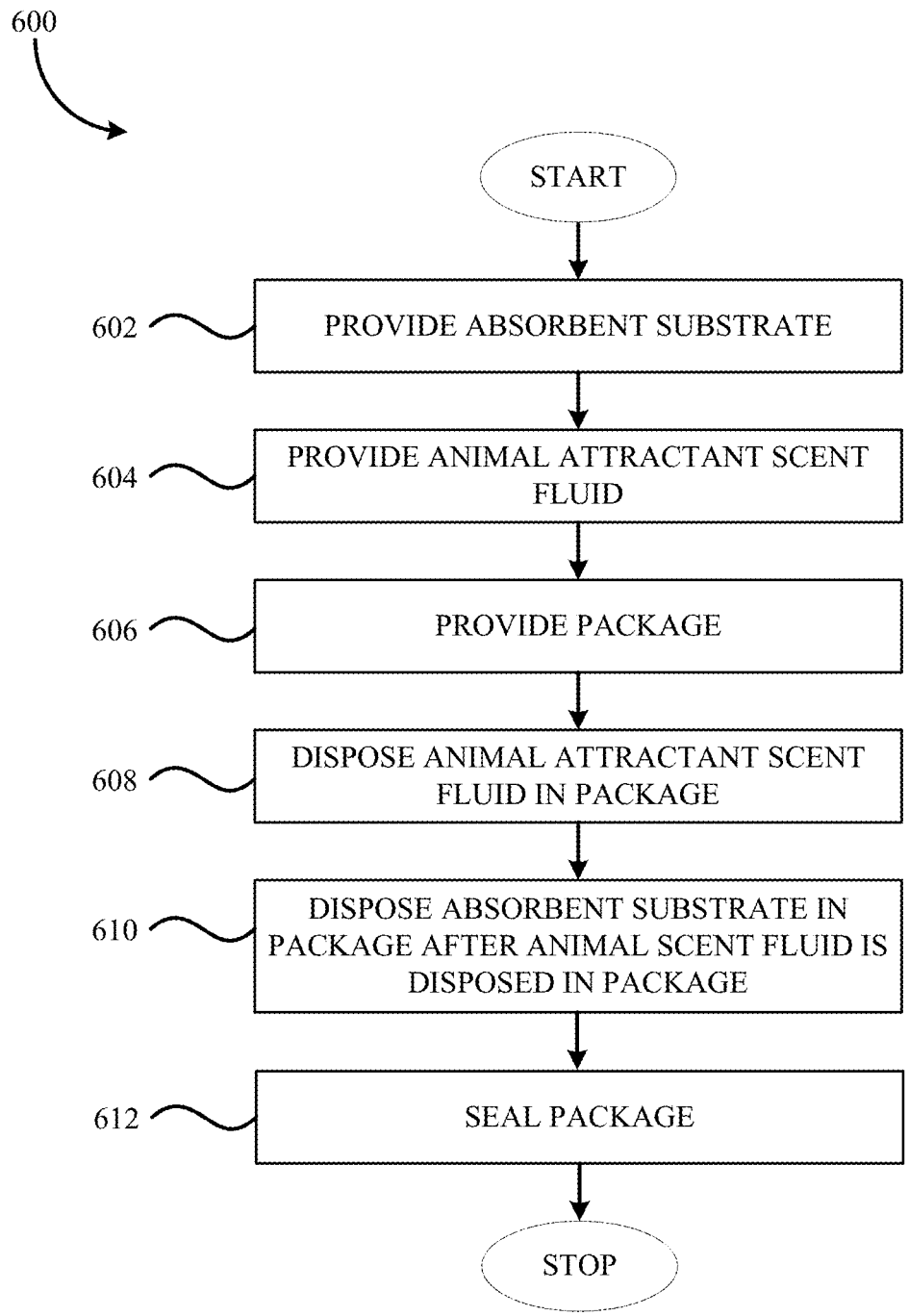
FIG. 6 is a flow-chart summarizing a method of manufacturing an animal lure.

FIG. 6 is a flow-diagram summarizing one method 600 for manufacturing an animal lure. In a first step 602, an absorbent substrate is provided. Then, in a second step 604, an animal attractant scent fluid is provided. Next, in a third step 606, a package is provided. Then, in a fourth step 608, the animal attractant scent fluid is disposed in the package. Next, in a fifth step 610, the absorbent substrate is disposed in the package after the animal scent fluid is disposed in the package. Finally, in a sixth step 612, the package is sealed.

Figure 7:
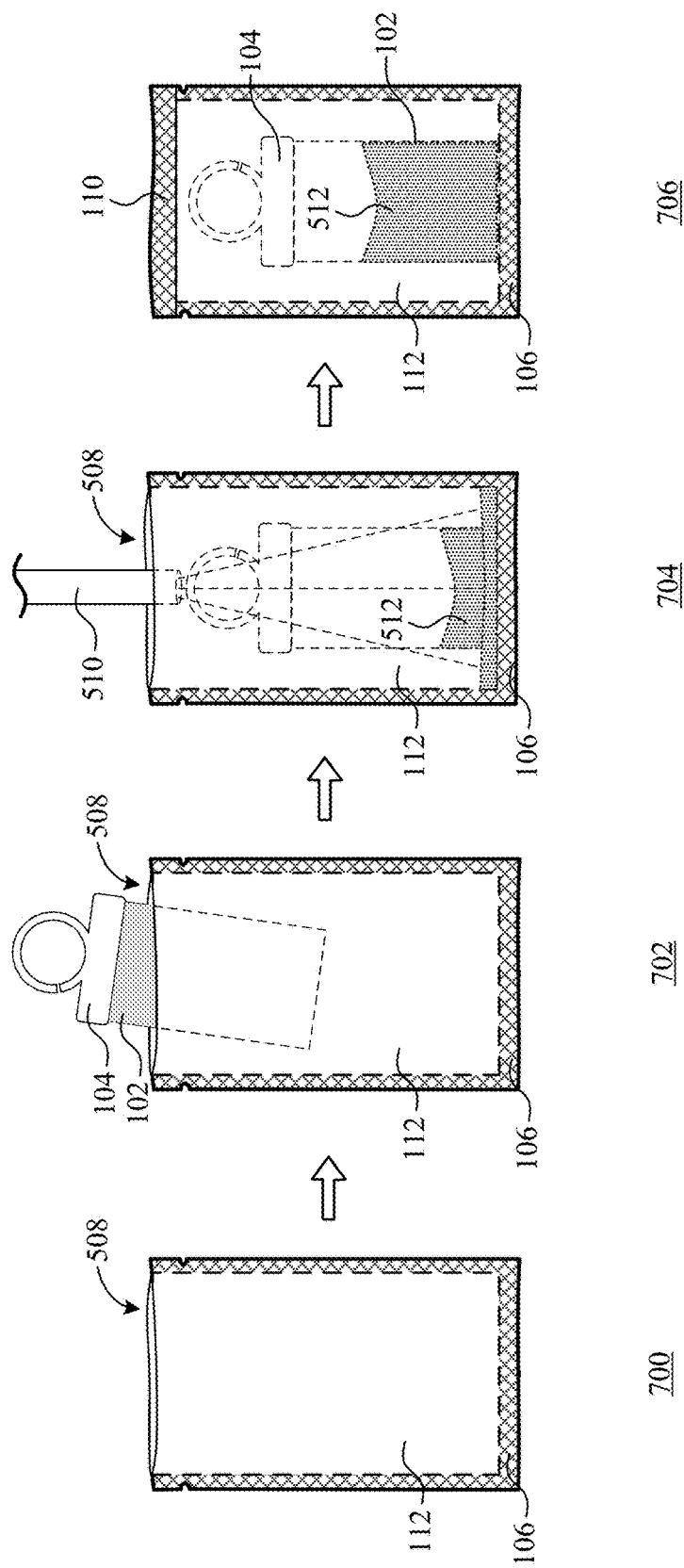
FIG. 7 is a process flow-diagram illustrating a method for manufacturing the animal lure of FIG. 1 according to another embodiment of the present invention.

FIG. 7 is a process flow-diagram illustrating an alternate method for manufacturing animal lure 100 according to another embodiment of the present invention. The example method is illustrated through a sequence of processes 700, 702, 704, and 706.

In process 700, package 106 is pulled open.

Next, in process 702, substrate 102 and attached extraction feature 104 are placed in interior region 112.

Then, in process 704, package 106 is aligned with fluid dispenser 510. Once aligned, dispenser 510 is inserted into interior region 112 and a sufficient volume of animal attractant scent fluid 512 is then dispensed into interior region 112.

Finally, in process 706, opening 508 is sealed by, for example, a hot bar sealing process. Those skilled in the art will recognize that processes 700, 702, 704, and 706 can be carried out in respective rotary machine stages as described in FIG. 5. Likewise, the same preservation measures (i.e., inert gas flushing, vacuum sealing, etc.) described in FIG. 5 can be applied to the processes described in FIG. 7.

Figure 8:
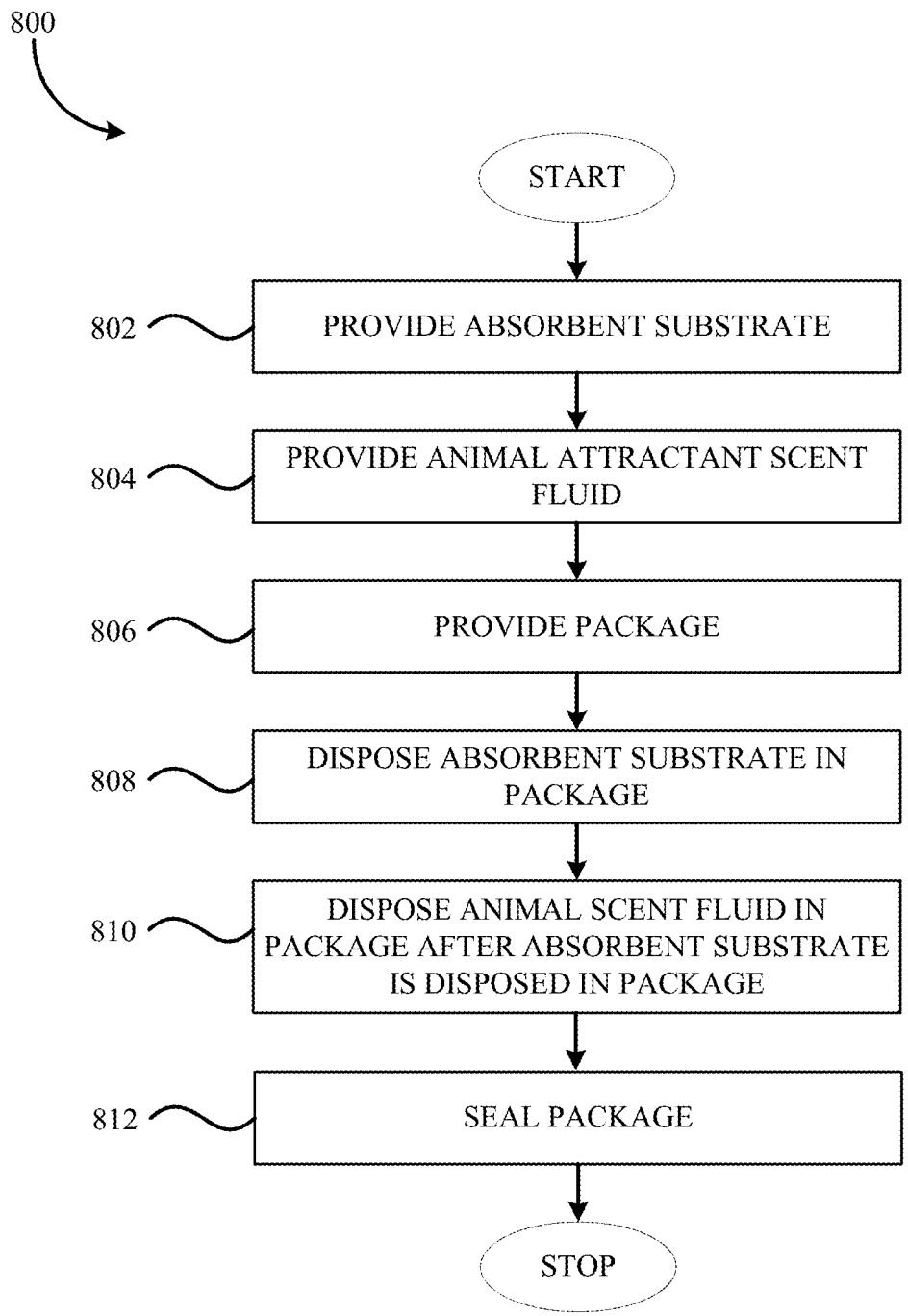
FIG. 8 is a flow-chart summarizing a method of manufacturing an animal lure according to another embodiment of the present invention.

FIG. 8 is a flow-diagram summarizing one method 800 for manufacturing an animal lure. In a first step 802, an absorbent substrate is provided. Then, in a second step 804, an animal attractant scent fluid is provided. Next, in a third step 806, a package is provided. Then, in a fourth step 808, the absorbent substrate is disposed in the package. Next, in a fifth step 810, the animal scent fluid is disposed in the package after the absorbent substrate is disposed in the package. Finally, in a sixth step 812, the package is sealed.

Figure 9:
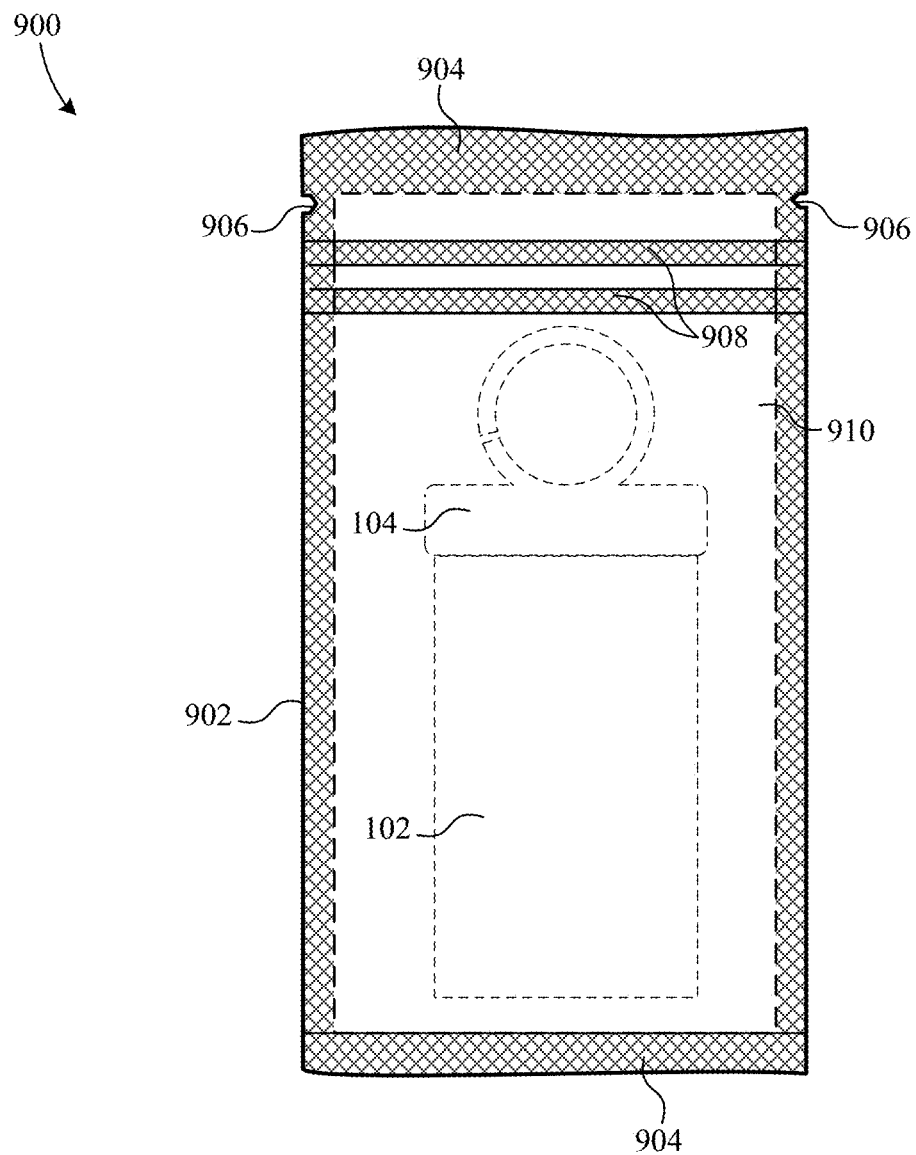
FIG. 9 is a front view of an animal lure according to another embodiment of the present invention.

FIG. 9 is a front view of an animal lure 900 according to another embodiment of the present invention. In this particular embodiment, animal lure 900 includes an animal attractant scent (not visible), substrate 102, and extraction feature 104, are all hermetically sealed within a package 902.

Package 902 is formed from an opaque fluid-proof material such as, for example, metalized film. Package 902 includes a permanent seal 904, a set of notches 906, and a reseal feature 908. Permanent seal 904 is formed completely around the peripheral of package 902 thereby defining in interior region 910 where saturated substrate 102 and extraction feature 104 are permanently sealed until package 902 is torn open between notches 906. Accordingly, permanent seal 904 also functions as a tamper evident feature of package 902. Once the user tears package 902 between notches 906, extraction feature 104 and substrate 102 are accessed by opening reseal feature 908. Reseal feature 908 is, for example, a re-sealable zipper that allows package 902 to be resealed. This provides advantages in that package 902 is sanitary after use. For example, feature 908 allows users to put package 902 back in their pocket without having any remaining animal scent leak and/or evaporate out to their clothes. Reseal feature 908 also allows substrate 102 and extraction feature 104 to be put back into, and resealed in, package 902 after use.

In the example embodiment, package 902 is a preformed, bottom load pouch wherein the top and both side regions of permanent seal 904 are already formed before substrate 102 and extraction feature 104 are permanently sealed in package 902. Before substrate 102 and extraction feature 104 are permanently sealed in package 902, package 902 includes an opening 912 (shown in FIG. 10) formed at the bottom of package 902. As will be described in upcoming FIG. 10, opening 912 provides access to interior region 910 during the packaging process.

Figure 10:
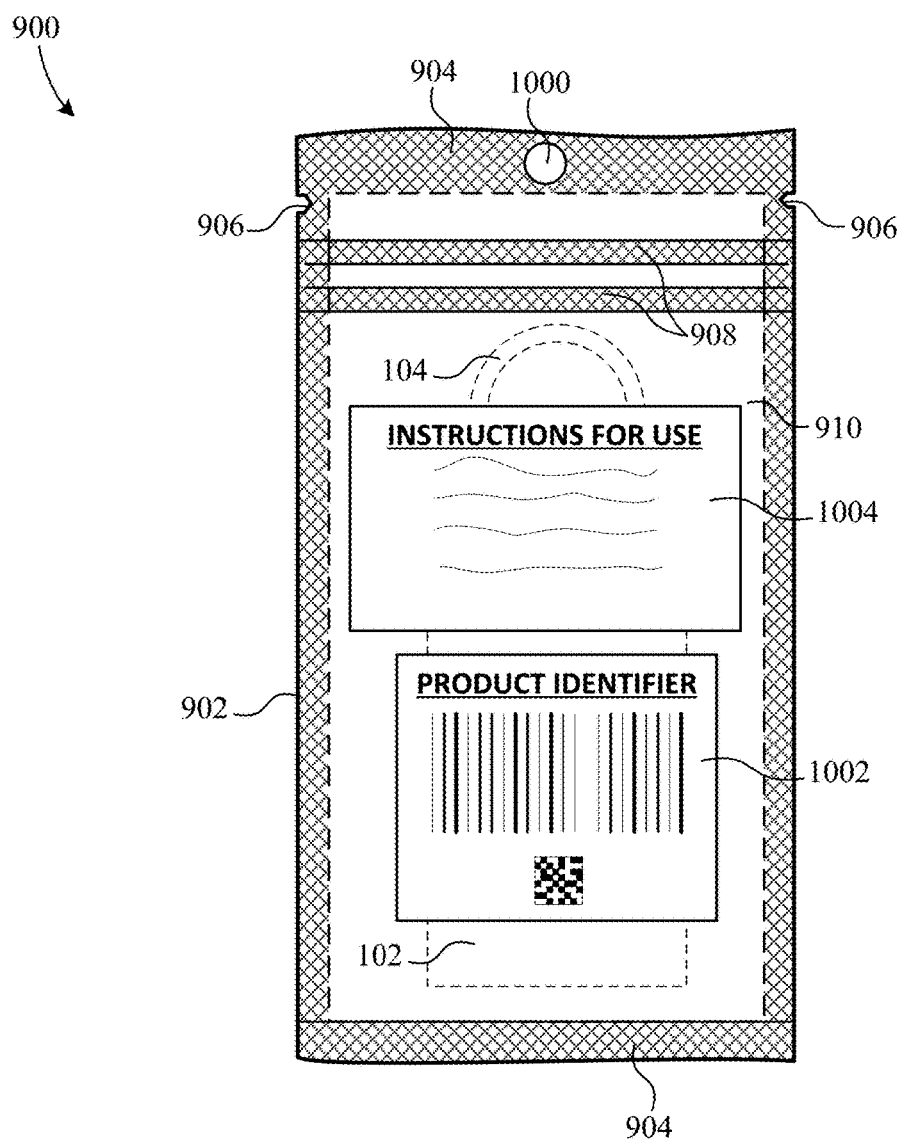
FIG. 10 is a front view of the animal lure of FIG. 9 according to another embodiment of the present invention.

FIG. 10 shows a front view of animal lure 900 according to an alternate embodiment of the present invention. In this particular embodiment, package 902 further includes a shelf-peg hole 1000, a product identifier 1002, and instructions for use 1004. Shelf-peg hole 1000 facilitates displaying animal lure 900 in retail stores. Product identifier 1002 is, for example, a universal product code for tracking animal lure 900 in retail and inventory environments. Instructions 1004 include instructions for using animal lure 900.

Figure 11:
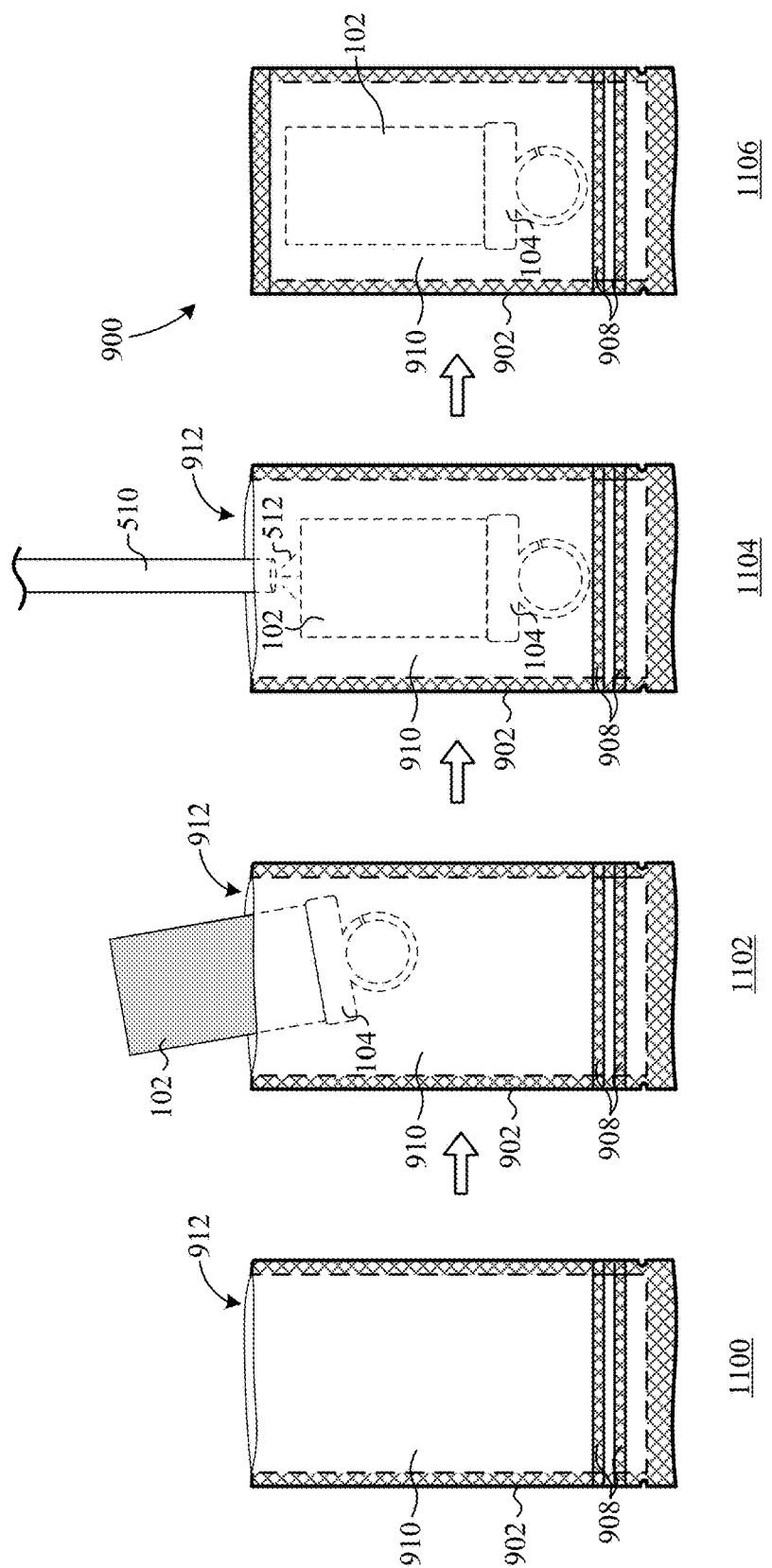
FIG. 11 is a process flow-diagram illustrating a method for manufacturing the animal lure of FIG. 9.

FIG. 11 is a process flow-diagram illustrating a method for manufacturing of animal lure 900 according to one embodiment of the present invention. The example method is illustrated through a sequence of processes 1100, 1102, 1104, and 1106.

In process 1100, package 902 is positioned upside down and opening 912 is pulled open.

Next, in process 1102, substrate 102 and attached extraction feature 104 are positioned upside down and placed through opening 912 and in interior region 910.

Then, in process 1104, opening 912 of package 902 is aligned with a fluid dispenser 510. Once aligned, dispenser 510 is inserted through opening 912 and into interior region 910. Then, a sufficient volume of animal attractant scent fluid 512 is dispensed into interior region 910 where it is absorbed by substrate 102.

Finally, in process 1106, opening 912 is sealed by, for example, a hot bar sealing process. Optionally, package 902 undergoes a vacuum sealing process to remove excess air from interior region 910 before opening 912 is completely sealed. As yet another option, the sequence of processes 1100, 1102, 1103, and 1104 includes a process of inert gas flushing interior region 910 before opening 912 is completely sealed.

Although the invention is not limited to a particular packaging process, processes 1100, 1102, 1104, and 1106 can be carried at different respective stages of an automated rotary machine. In such a case, process 1100 is carried out at a first rotary stage where package 902 is pulled from a hopper and opened by some suitable means such as, for example, vacuum suction cups. Then, the rotary machine rotates 90 degrees to position open package 902 at a second rotary stage where scent fluid 512 is dispensed from dispenser 510. After process 1102, the rotary machine rotates another 90 degrees to a third rotary stage where substrate 102 and attached extraction feature 104 are dropped into interior region 910 upside down, either automatically or manually. Next, the rotary machine rotates another 90 degrees to position open package 902, scent fluid 512, substrate 102, and extraction feature 104 at a fourth stage where package 902 is hot bar sealed and then dropped into a catch bin. Once animal lure 900 is dropped, the cycle is complete and rotary machine continues to rotate another 90 degrees, thereby returning to the first stage where the process is repeated.

Figure 12:
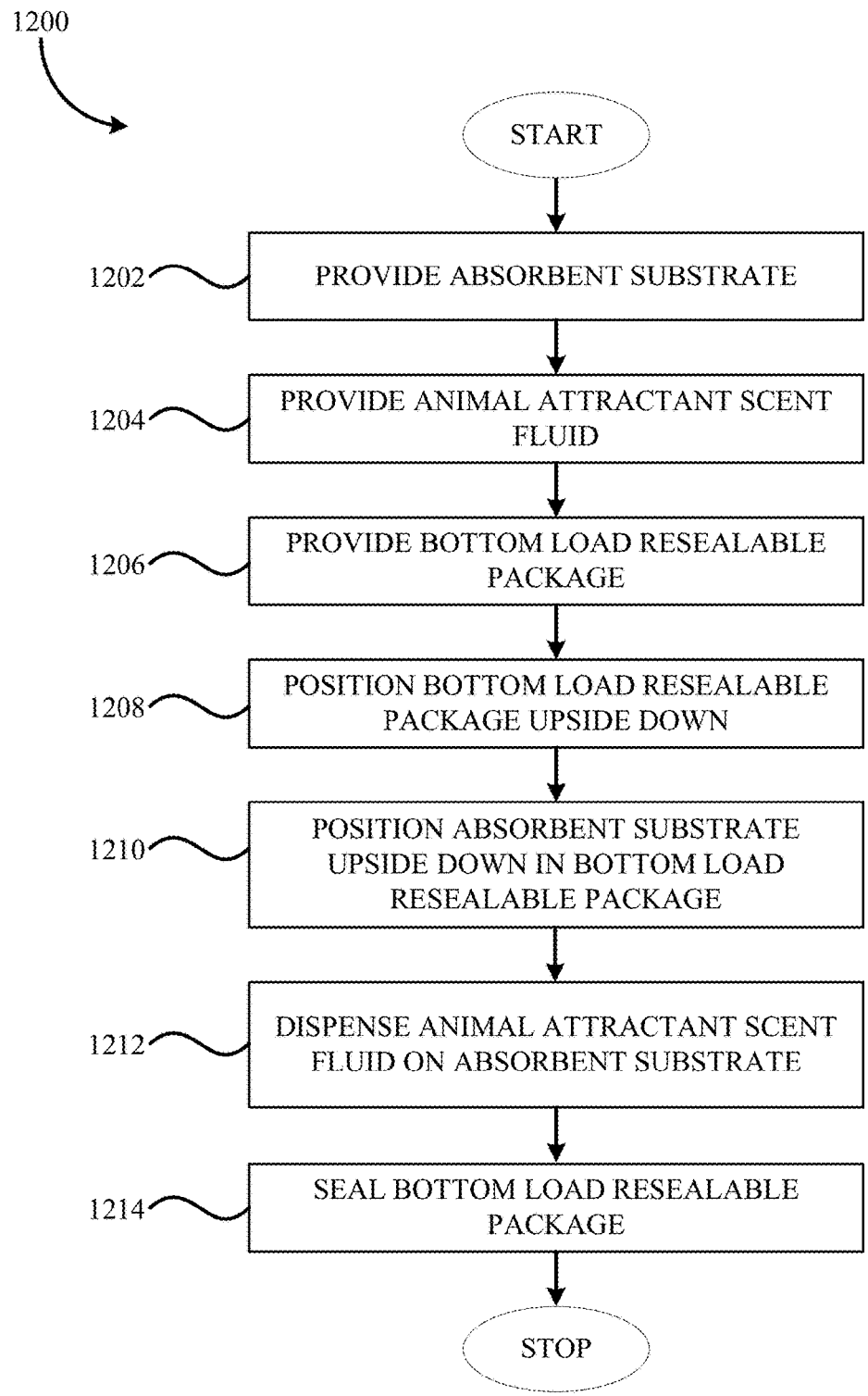
FIG. 12 is a flow-chart summarizing a method of manufacturing an animal lure.

FIG. 12 is a flow-diagram summarizing one method 1200 for manufacturing an animal lure. In a first step 1202, an absorbent substrate is provided. Then, in a second step 1204, an animal attractant scent fluid is provided. Next, in a third step 1206, a bottom load resealable package is provided. Then, in a fourth step 1208, the bottom load resealable package is positioned upside down. Next, in a fifth step 1210, the absorbent substrate is positioned in the bottom load resealable package upside down. Then, in a sixth step 1212, the animal attractant scent fluid is dispensed on the absorbent substrate. Finally, in a seventh step 1214, the bottom load resealable package is sealed.

Figure 13:
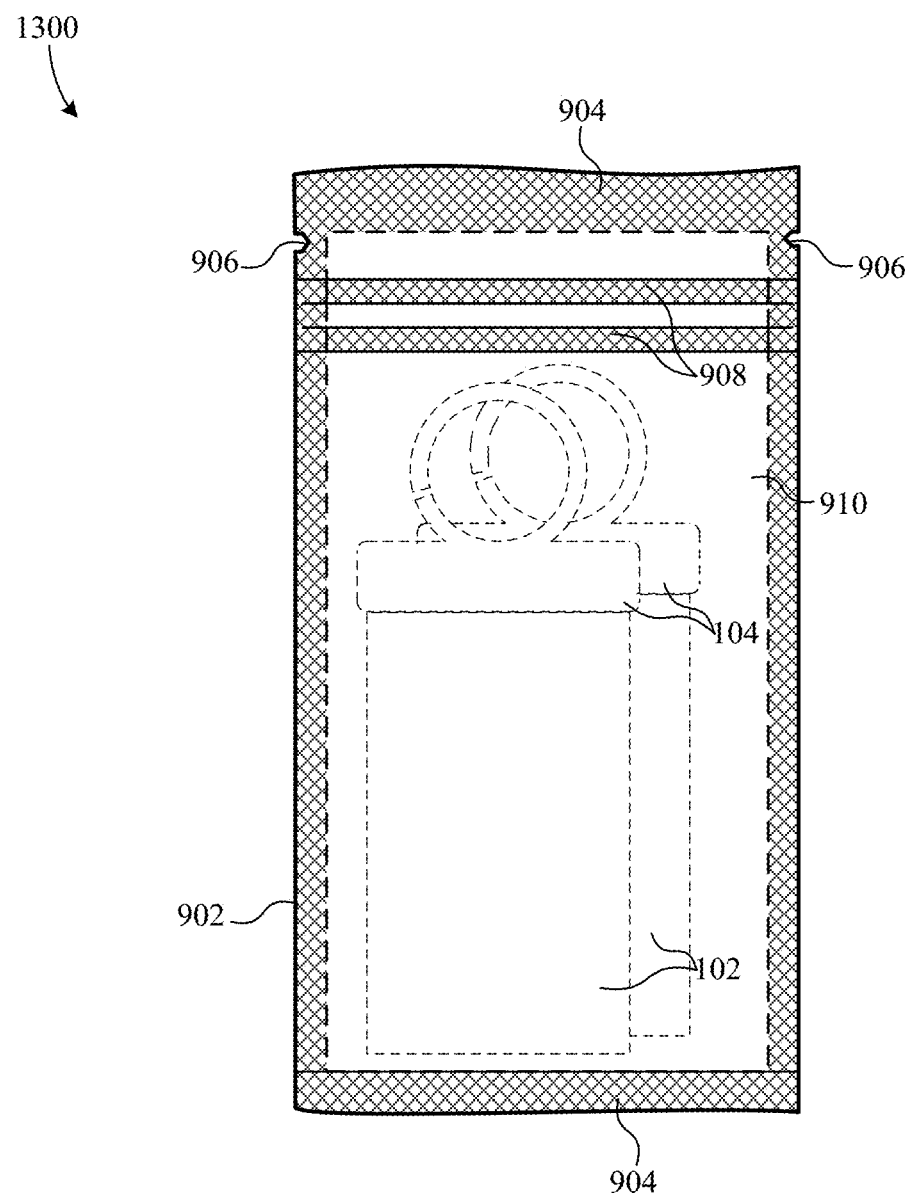
FIG. 13 is a front view of an animal lure according to yet another embodiment of the present invention.

FIG. 13 shows a front view of animal lure 1300 according to an alternate embodiment of the present invention. In this particular embodiment, animal lure 1300 is substantially the same as animal lure 900. The only difference between animal lure 1300 and animal lure 900 is that animal lure 1300 includes a plurality of substrates 102 and respective extraction features 104 disposed in a single interior region 910.

Figure 14:
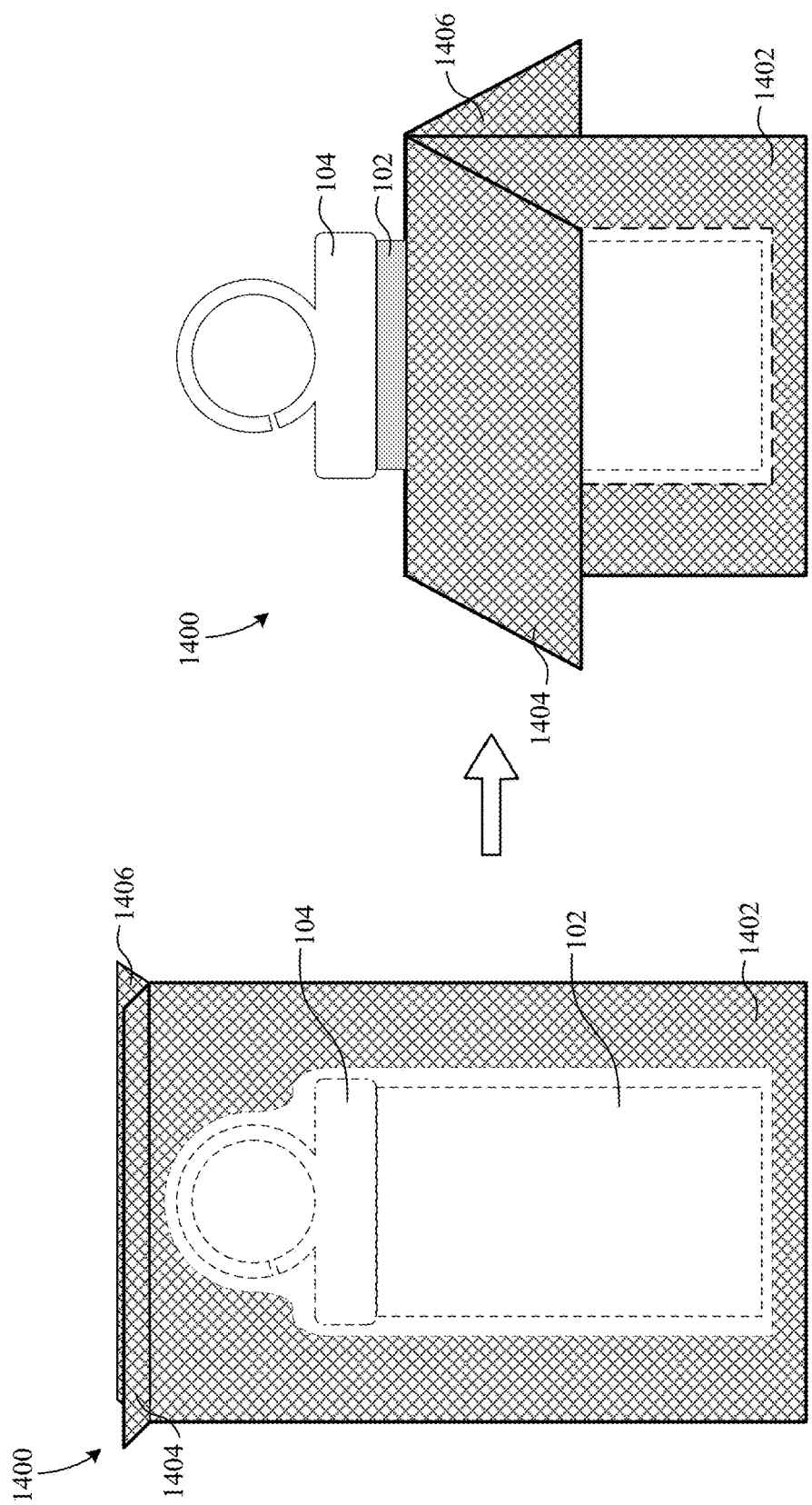
FIG. 14 is a front view of an animal lure according to yet another embodiment of the present invention.

FIG. 14 is a front view of an animal lure 1400 according to yet another embodiment of the present invention. In this particular embodiment, animal lure 1400 includes an animal attractant scent (not visible), substrate 102, and extraction feature 104, all hermetically sealed within a peel package 1402. Package 1402 includes a first piece 1404 and a second piece 1406 of, for example, metalized film bonded together around substrate 102 and extraction feature 104. As shown, the top portions of pieces 1404 and 1406 are left unbound such that each can be gripped and pulled apart, thereby exposing extraction feature 104.

Figure 15:
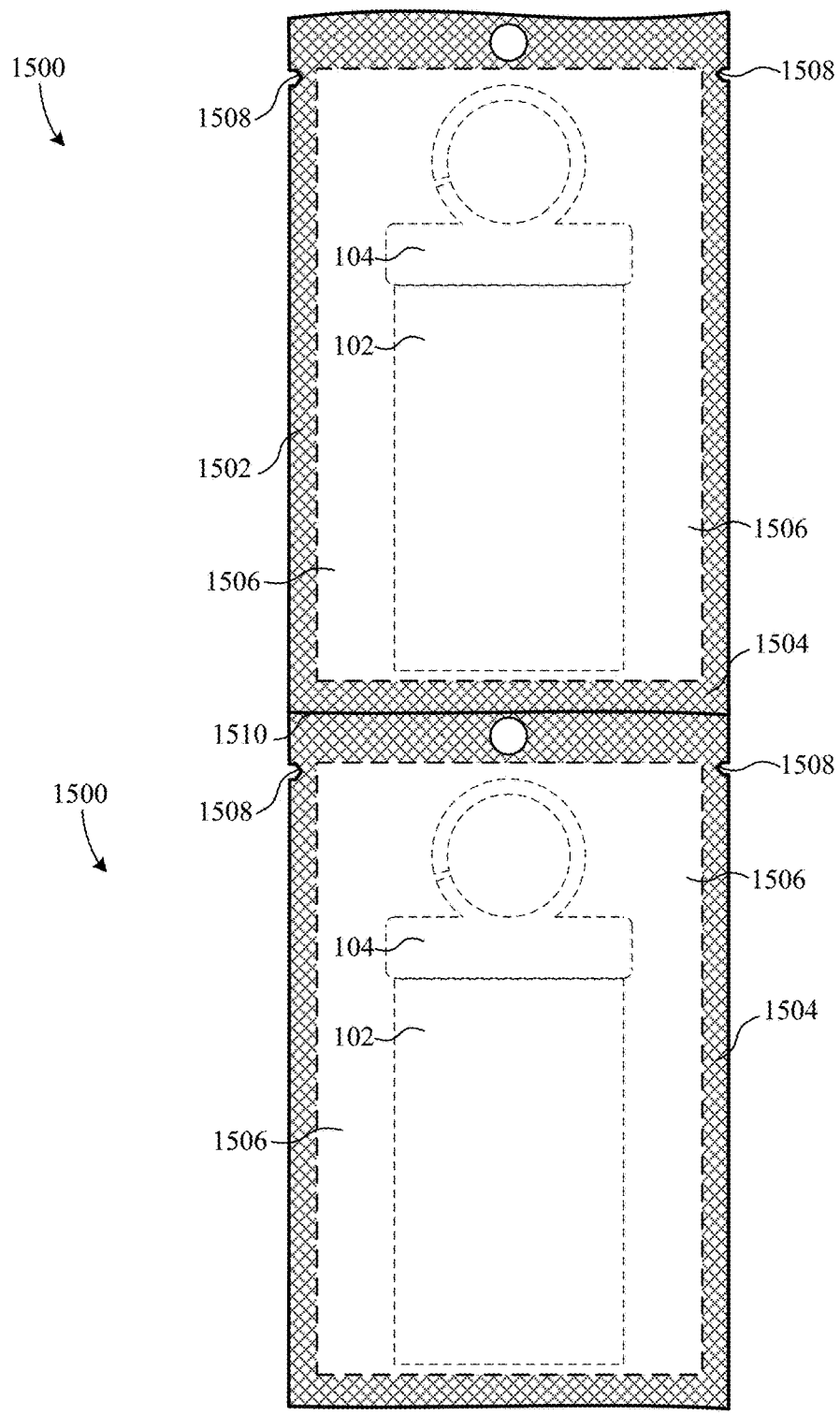
FIG. 15 is a front view of an animal lure according to yet another embodiment of the present invention.

FIG. 15 is a front view of a plurality of animal lures 1500 according to yet another embodiment of the present invention. Animal lures 1500 includes an animal attractant scent (not visible), a plurality of substrates 102, and a respective plurality of extraction features 104, all hermetically sealed within a package 1502.

In this particular embodiment, package 1502 is a form-fill package that is formed around substrates 102 and respective extraction features 104 after substrates 102 are saturated with animal attractant scent. In this example, package 1502 is form-fill packaged in a strip format. Package 1502 is formed from an opaque fluid-proof material such as, for example, metalized film, metalized paper, thin plastic, etc. Package 1502 includes a permanent seal 1504 formed completely around the peripheral of packages 1502 thereby defining interior regions 1506 where saturated substrate 102 and extraction feature 104 are permanently sealed until use. Accordingly, seal 1504 is inherently tamper evident. Package 1502 further includes two pairs of notches 1508 for tearing the tops of packages 1502 open. Package 1502 further includes a perforated line 1510 that facilitates the separating of each individual one of animal lures 1500 from one another.

Figure 16A:
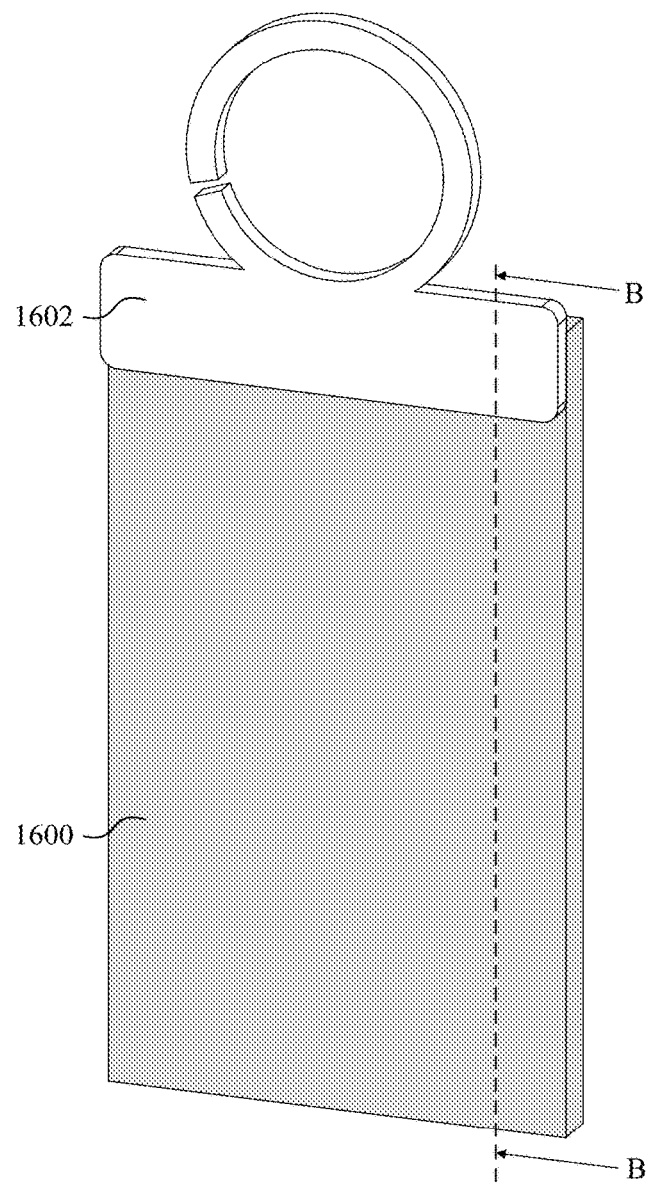
FIG. 16A is a perspective view of an absorbent substrate and an extraction feature according to an alternative embodiment of the present invention.

FIG. 16A shows a front perspective view of a substrate 1600 and an extraction feature 1602 according to an alternate embodiment of the present invention. In this particular embodiment, substrate 1600 and extraction feature 1602 are substantially similar to substrate 102 and extraction feature 104, respectively. The only difference being how substrate 1600 and extraction feature 1602 are attached to one another.

Figure 16B:
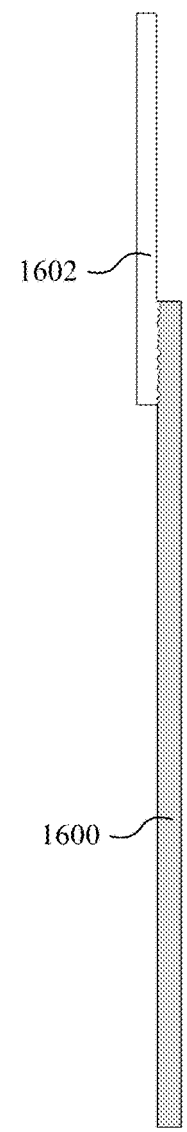
FIG. 16B is a cross-sectional side view of the absorbent substrate and the extraction feature of FIG. 16A taken along line B-B of FIG. 16A.

FIG. 16B shows a cross-sectional side view of substrate 1600 and extraction feature 1602 taken along line B-B of FIG. 16A. Extraction feature 1602 directly engages fibers of substrate 1600 without an adhesive. This is accomplished by forming extraction feature 1602 directly on substrate 1600. That is, extraction feature 1602 is molded directly on substrate 1600 using a non-absorbent material such as, for example, plastic. When the plastic is in the molten state, it flows into the fiber network of substrate 1600 such that when the plastic hardens, extraction feature 1602 is attached directly to substrate 1600. Unlike many adhesives, the bond between extraction feature 1602 and substrate 1600 does not break down when exposed to different types of liquids.

Figure 17A:
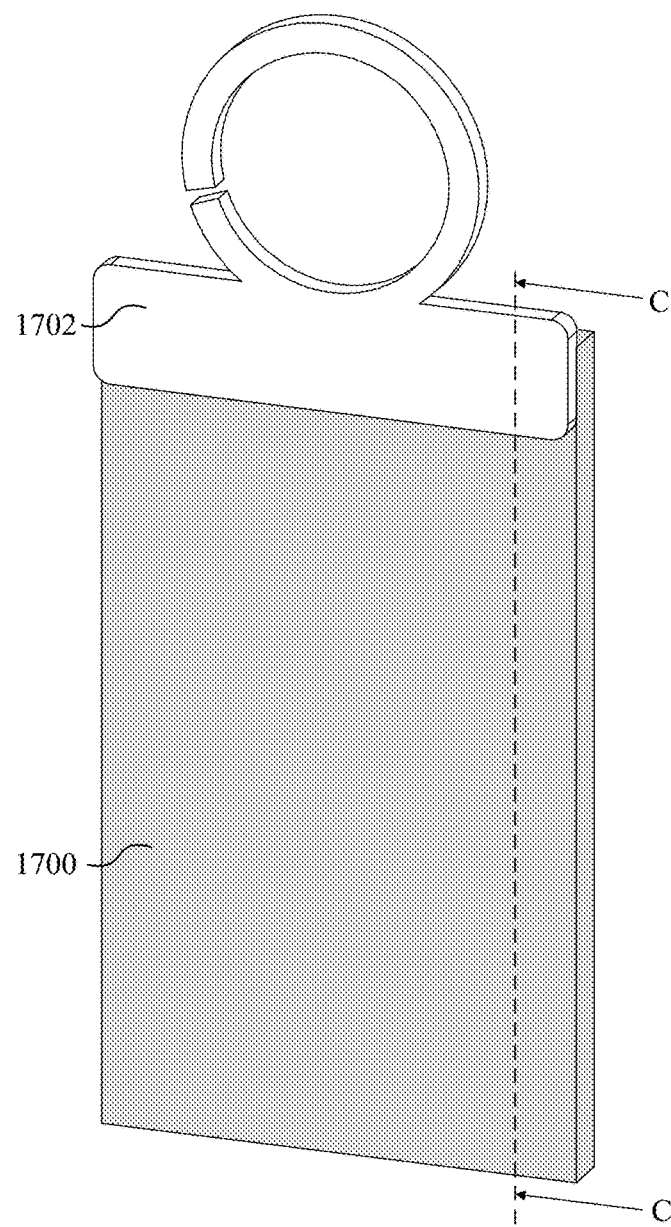
FIG. 17A is a perspective view of an absorbent substrate and an extraction feature according to yet another embodiment of the present invention.

FIG. 17A shows a front perspective view of a substrate 1700 and an extraction feature 1702 according to yet another alternate embodiment of the present invention. In this particular embodiment, substrate 1700 and extraction feature 1702 are substantially similar to substrate 102 and extraction feature 104, respectively. The only difference is how substrate 1700 and extraction feature 1702 are attached to one another.

Figure 17B:
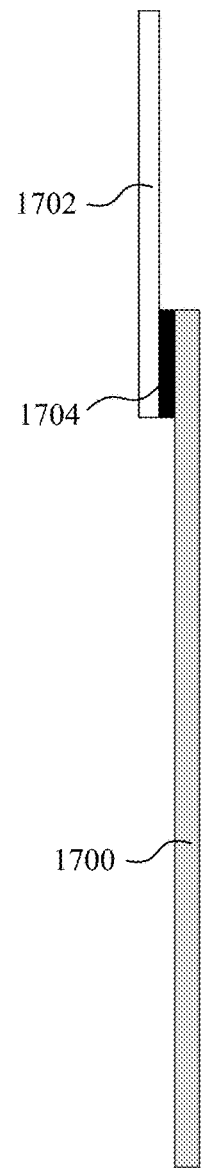
FIG. 17B is a cross-sectional side view of the absorbent substrate and the extraction feature of FIG. 17A taken along line C-C of FIG. 17A.

FIG. 17B shows a cross-sectional side view of substrate 1700 and extraction feature 1702 taken along line C-C of FIG. 17A. Substrate 1700 and extraction feature 1702 are both preformed and then bonded to one another via an adhesive 1704 dispose therebetween. In this example, adhesive 1704 is substantially resistant to breakdown when exposed to organic animal attractant scent fluids (i.e. animal urine) and inorganic animal attractant scent fluids (i.e. synthetic scents).

Figure 18:
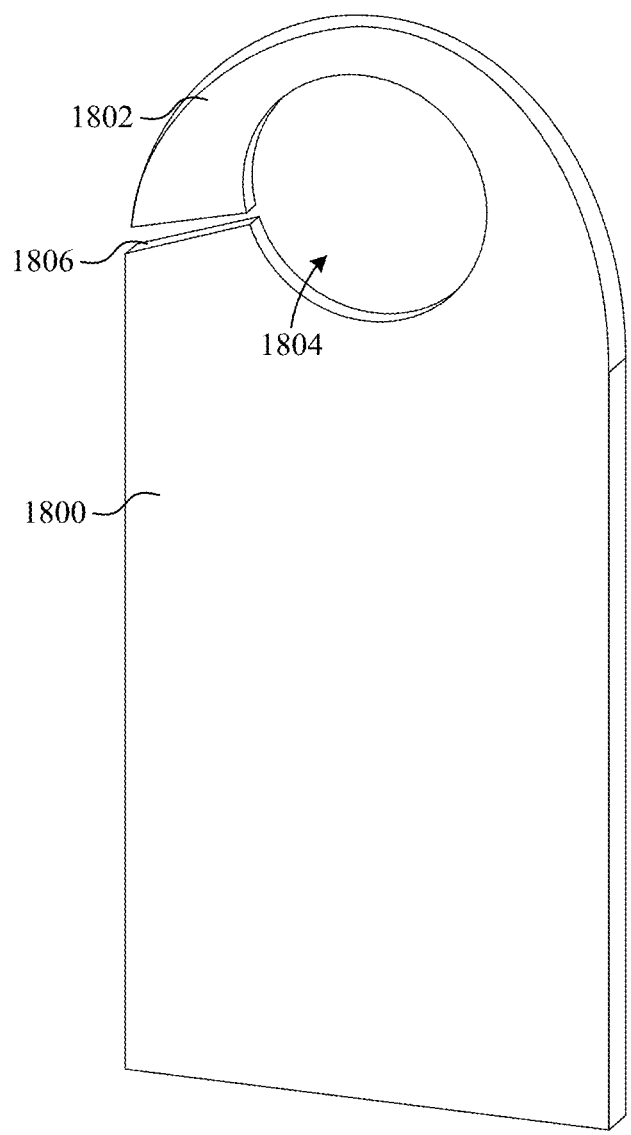
FIG. 18 a perspective view of an absorbent substrate according to yet another embodiment of the present invention.

FIG. 18 shows a perspective view of a substrate 1800 according to yet another embodiment of the present invention. In the example embodiment, substrate 1800 includes an integral hanger 1802. Hanger 1802 is defined by an aperture 1804 and a notch 1806 formed in substrate 1800.

Those skilled in the art will recognize that substrate 102 and extraction feature 104 may be substituted with any of the substrates and extraction features previously described in FIGS. 16A, 17A, and 18 in any of the previously described embodiments without departing from the scope of the invention.

Figure 19:
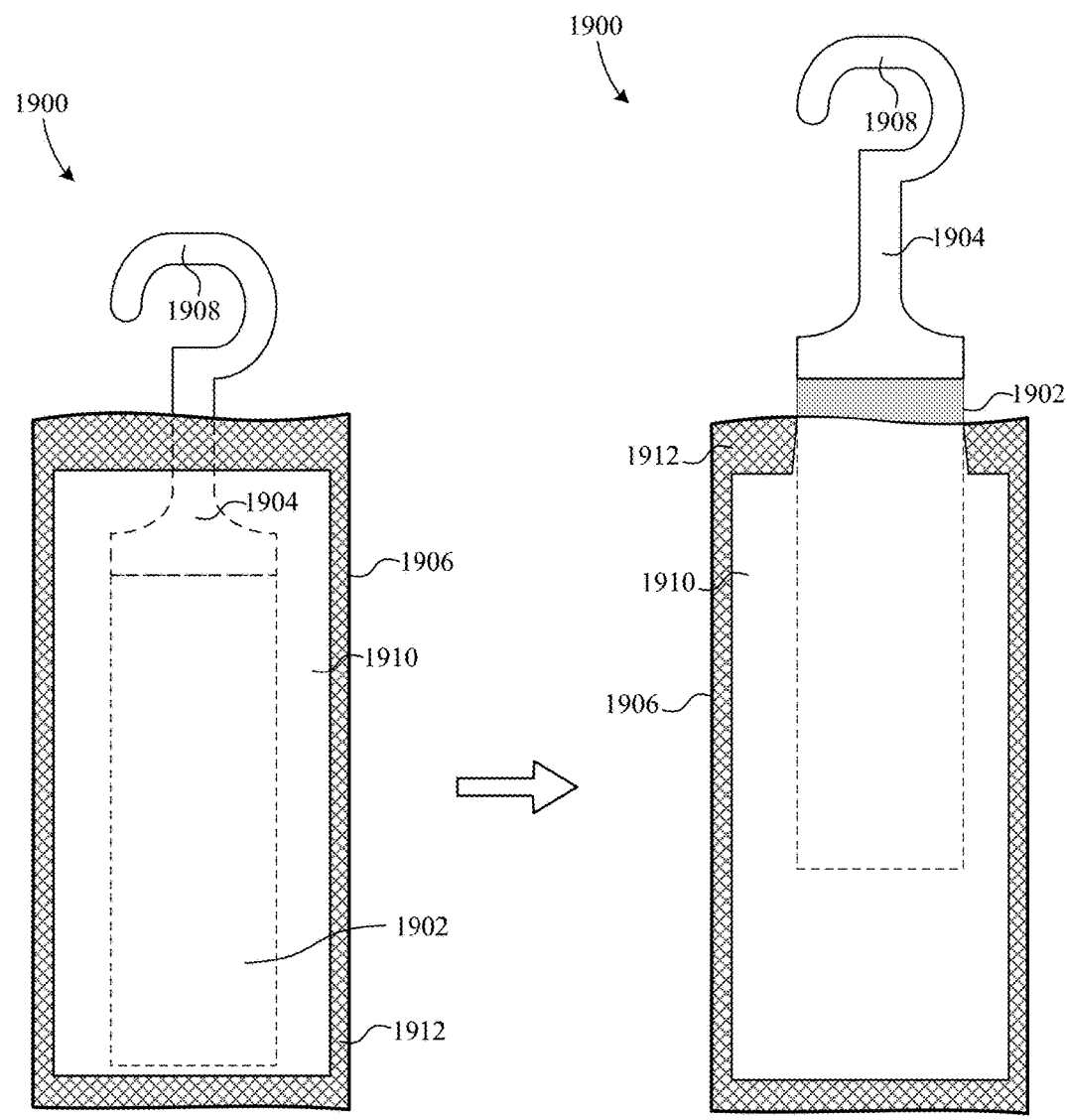
FIG. 19 shows front views of an animal lure according to another embodiment of the present invention.

FIG. 19 shows front views of an animal lure 1900 according to yet another embodiment of the present invention. Animal lure 1900 includes an animal attractant scent (not visible), an absorbent substrate 1902, a nonabsorbent extraction feature 1904, and a hermetically sealed package 1906. Other than physical shape, absorbent substrate 1902 is substantially identical to previously described absorbent substrate 102. Extraction feature 1904 is fixed directly to substrate 1902 and includes a hanger feature 1908 for hanging saturated substrate 1902 from objects (i.e. tree limbs). In the example embodiment, substrate 1902 is completely hermetically sealed within an interior region 1910 of package 1906 and extraction feature 1904 is sealed partially in interior region 1910. In other words, the sealed edge 1912 of package 1906 is sealed directly on extraction feature 1904 such that fluid cannot pass therebetween when animal lure 1900 is unopened. To open animal lure 1900, the user pulls hanger feature 1908 and package 1906 apart, thereby extracting substrate 1902 through sealed edge 1912.

Figure 20:
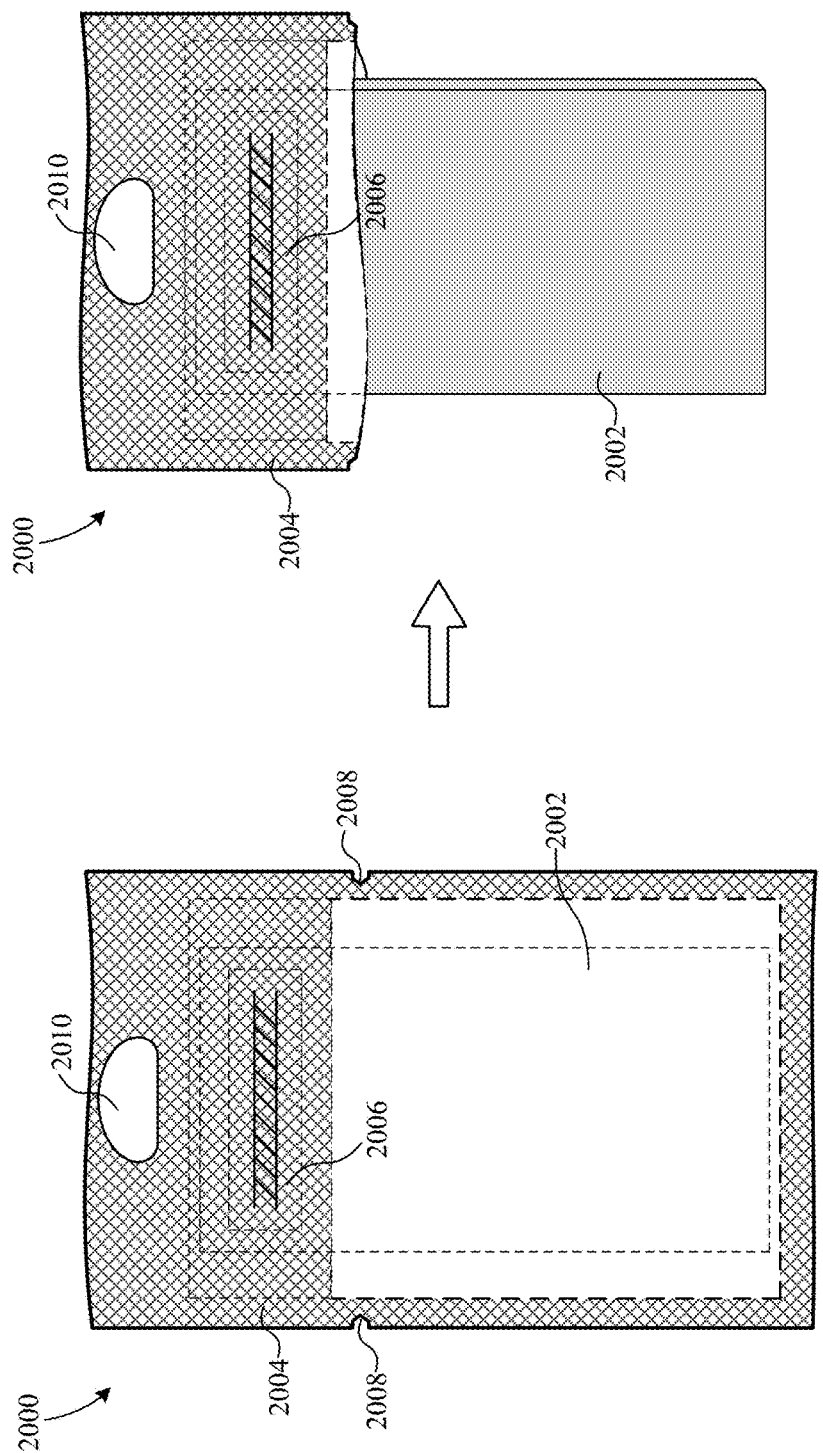
FIG. 20 shows front views of an animal lure according to yet another embodiment of the present invention.

FIG. 20 shows front views of an animal lure 2000 according to yet another embodiment of the present invention. Animal lure 2000 includes an animal attractant scent (not visible) and an absorbent substrate 2002 hermetically sealed in a package 2004. Other than physical shape, absorbent substrate 2002 is substantially identical to previously described absorbent substrate 102. In this example, the top end of substrate 2002 is fixed to package 2004 such that package 2004 also functions as a means to hang substrate 2002 from objects. Substrate 2002 includes an aperture 2006 through which the front and back of package 2004 are bonded together by, for example, heat and pressure. Alternatively, the top of substrate 2002 can be bonded to package 2004 via an adhesive. Package further includes a set of notches 2008 positioned below the point at which substrate 2002 is bonded to package 2004. This allows the lower portion of package 2004 to be removed, thereby exposing saturated substrate 2002. Furthermore, package 2004 includes a large shelf-peg hole 2010 that also functions as a hanger feature to hang substrate 2002 from objects (i.e. tree limbs).

Figure 21:
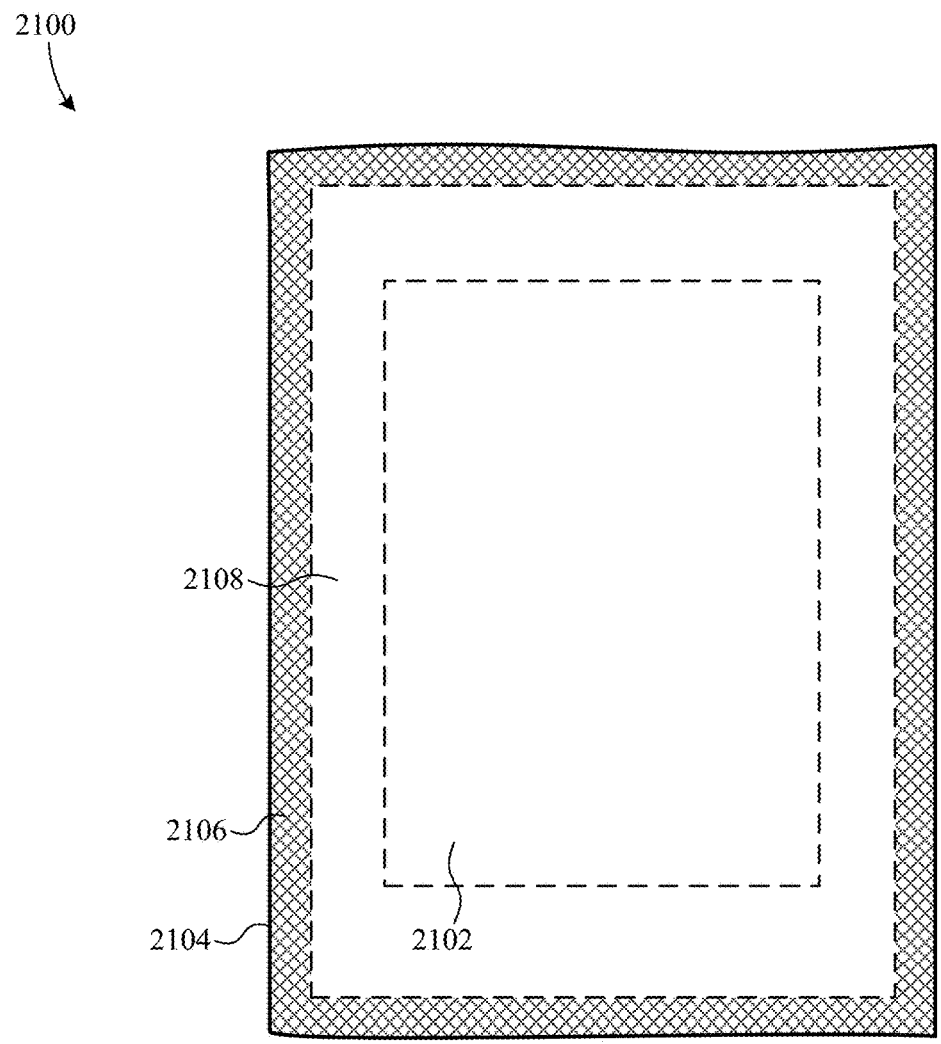
FIG. 21 shows a front view of an animal lure according to yet another embodiment of the present invention.

FIG. 21 shows a front view of an animal lure 2100 according to yet another embodiment of the present invention. In this embodiment, animal lure 2100 includes an absorbent substrate 2102 that is saturated with animal attractant scent fluid and hermetically sealed within a package 2104. The peripheral edge of package 2104 includes a seal 2106 formed completely around an interior region 2108 of package 2104. Package 2104 is formed from an opaque, flexible, fluid-proof material. Package 2104 may be formed from a preformed pouch. Alternatively, package 2104 may be formed directly around substrate 2102 by, for example, form-fill packaging. The description of particular embodiments of the present invention is now complete.

Many of the described features may be substituted, altered or omitted without departing from the scope of the invention. For example, alternate materials (e.g., plastic film, metalized paper, etc.), may be substituted for the metalized film. These and other deviations from the particular embodi-

I claim:

1. A packaged animal lure comprising:
an animal lure including
an absorbent substrate,
animal urine disposed directly on said absorbent substrate, and
a nonabsorbent, polymeric handle directly mechanically fastened or adhered to said absorbent substrate; and
a flexible, fluid-proof package, said absorbent substrate and said animal urine being hermetically sealed in said package, said package being permanently sealed, and said package being opaque; and wherein
said handle is disposed completely within said flexible, fluid-proof package, and is adapted to facilitate the removal of said absorbent substrate from said flexible, fluid-proof package and to suspend said absorbent substrate from an object;
a total amount of said animal urine in said fluid-proof package is less than the absorption capacity of said absorbent substrate; and
wherein said animal lure is completely detached from said package for use.

2. The packaged animal lure of claim 1, wherein at least part of said handle includes a hanger feature.

3. The packaged animal lure of claim 1, wherein said package comprises metalized laminate film.

4. The packaged animal lure of claim 1, wherein said package is a form-fill-seal package.

5. The packaged animal lure of claim 1, wherein a weight of said total amount of said animal urine is greater than 285% of a weight of said absorbent substrate and less than 315% of said weight of said absorbent substrate.

6. A packaged animal lure comprising:
an animal lure including
a unitary, absorbent, fabric substrate,
a handle directly connected to said absorbent substrate;
natural or synthetic animal urine disposed directly on said absorbent substrate; and
a flexible, fluid-proof package; and wherein
said handle, said absorbent substrate, and said animal urine are permanently, hermetically sealed in said package;
said absorbent substrate is capable of absorbing all of said animal attractant fluid sealed in said fluid-proof package; and
said animal lure is completely detached from said package for use.

7. The packaged animal lure of claim 6, wherein said handle mechanically engages said absorbent substrate.

8. The packaged animal lure of claim 7, wherein at least part of said handle passes through said absorbent substrate.

9. The packaged animal lure of claim 6, wherein said handle is bonded to said non-absorbent substrate via a urine-resistant adhesive, whereby said handle remains connected to said absorbent substrate when said absorbent substrate has urine disposed thereon.

10. The packaged animal lure of claim 6, wherein said handle is non-absorbent.

11. The packaged animal lure of claim 6, wherein said handle includes a hanger feature.

12. The packaged animal lure of claim 11, wherein said handle is a garment hook.

13. The packaged animal lure of claim 6, wherein said fluid proof package is opaque.

14. The packaged animal lure of claim 6, wherein said package is tamper evident.

15. The packaged animal lure of claim 6, wherein said package is formed from metalized laminate film.

16. The packaged animal lure of claim 6, wherein said package includes a preformed pouch.

17. The packaged animal lure of claim 16, wherein said preformed pouch is a bottom load pouch.

18. The packaged animal lure of claim 17, wherein said package includes a zip seal feature.

19. The packaged animal lure of claim 6, wherein said package includes a form fill seal package.

20. The packaged animal lure of claim 6, wherein said package is a peel package.

21. The packaged animal lure of claim 6, wherein said absorbent substrate is vacuum sealed in said package.

22. The packaged animal lure of claim 6, further comprising an inert gas disposed in said package.

23. The packaged animal lure of claim 6, wherein:
said animal urine has a color; and
said absorbent substrate has a color darker than said color of said animal urine.

24. The packaged animal lure of claim 6, wherein said urine includes synthetic urine.

25. A method of manufacturing a packaged animal lure, said method comprising:
providing an absorbent substrate;
providing natural or synthetic animal urine;
providing a hanger directly connected to said absorbent substrate;
disposing said animal urine directly on said absorbent substrate;
providing a flexible, fluid proof package; and
permanently, hermetically sealing said absorbent substrate, said hanger, and a total amount of said animal urine in said package; and wherein
said absorbent substrate has a capacity to absorb said total amount of said animal urine sealed in said package; and wherein
said package is a preformed pouch; and
said step of permanently sealing said absorbent substrate and said animal urine in said package is carried out after said absorbent substrate and said animal urine is disposed in said pouch.

26. The packaged animal lure of claim 6, wherein a weight of said animal urine sealed in said package is greater than 285% of a weight of said absorbent substrate and less than 315% of said weight of said absorbent substrate.

27. The method of claim 25, wherein said step of disposing said animal urine directly on said absorbent substrate includes disposing an amount of said animal that weighs more than 285% of a weight of said absorbent substrate and less than 315% of said weight of said absorbent substrate.

* * * * *